US010504001B2

(12) United States Patent
Dwan et al.

(10) Patent No.: US 10,504,001 B2
(45) Date of Patent: *Dec. 10, 2019

(54) DUPLICATE/NEAR DUPLICATE DETECTION AND IMAGE REGISTRATION

(71) Applicant: DROPBOX, INC., San Francisco, CA (US)

(72) Inventors: Michael Dwan, San Francisco, CA (US); Jinpeng Ren, Mountain View, CA (US)

(73) Assignee: Dropbox, Inc., San Francisco, CA (US)

( * ) Notice: Subject to any disclaimer, the term of this patent is extended or adjusted under 35 U.S.C. 154(b) by 210 days.

This patent is subject to a terminal disclaimer.

(21) Appl. No.: 15/335,130

(22) Filed: Oct. 26, 2016

(65) Prior Publication Data
US 2017/0046595 A1 Feb. 16, 2017

Related U.S. Application Data

(63) Continuation of application No. 13/888,082, filed on May 6, 2013, now Pat. No. 9,530,072.
(Continued)

(51) Int. Cl.
G06K 9/62 (2006.01)
G06F 16/583 (2019.01)
G06K 9/46 (2006.01)

(52) U.S. Cl.
CPC ......... *G06K 9/6215* (2013.01); *G06F 16/583* (2019.01); *G06F 16/5838* (2019.01); *G06K 9/4642* (2013.01); *G06K 9/6298* (2013.01)

(58) Field of Classification Search
None
See application file for complete search history.

(56) References Cited

U.S. PATENT DOCUMENTS 7,227,116 B2 6/2007 Gleckler
7,801,893 B2 9/2010 Gulli' et al.
(Continued)

FOREIGN PATENT DOCUMENTS

EP 990997 4/2000

OTHER PUBLICATIONS

Alejandro Jaimes, Shih-Fu Chang, Alexander C. Loui, "Duplicate detection in consumer photography and news video," Multimedia '02 Proceedings of the tenth ACM international conference on Multimedia pp. 423-424, ISBN:1-58113-620-X.
(Continued)

*Primary Examiner* — Chan S Park
*Assistant Examiner* — Elisa M Rice
(74) *Attorney, Agent, or Firm* — Keller Jolley Preece

(57) ABSTRACT

Embodiments are disclosed for detecting duplicate and near duplicate images. An exemplary method includes receiving an original image, preparing the image for fingerprinting, and calculating an image fingerprint, the fingerprint expressed as a sequence of numbers. The method further includes comparing the image fingerprint thus obtained with a set of previously stored fingerprints obtained from a set of previously stored images, and determining if the original image is either a duplicate or a near duplicate of an image in the set if the dissimilarity between the two fingerprints is less than a defined threshold T. Once a duplicate or near duplicate is detected, various defined actions may be taken, including culling the less desirable image or referring the redundancy to a user.

20 Claims, 15 Drawing Sheets

Related U.S. Application Data

(60) Provisional application No. 61/800,228, filed on Mar. 15, 2013.

(56) References Cited

U.S. PATENT DOCUMENTS

| | | |
|---|---|---|
| 7,860,308 B2 | 12/2010 | Shah |
| 8,131,118 B1 | 3/2012 | Jing |
| 8,213,723 B2 | 7/2012 | Sawant et al. |
| 8,332,429 B2 | 12/2012 | Poirier et al. |
| 8,611,617 B1 | 12/2013 | Baluja |
| 9,245,007 B2 | 1/2016 | Joshi |
| 2002/0176632 A1 | 11/2002 | Chrysafis |
| 2005/0183128 A1 | 8/2005 | Assayag |
| 2007/0030364 A1 | 2/2007 | Obrador |
| 2008/0298642 A1 | 12/2008 | Meenen |
| 2009/0003709 A1 | 1/2009 | Kaneda |
| 2010/0074528 A1 | 3/2010 | Hu et al. |
| 2010/0316290 A1 | 12/2010 | Jia |
| 2011/0116690 A1 | 5/2011 | Ross et al. |
| 2012/0027288 A1 | 2/2012 | Yuan |
| 2012/0051634 A1* | 3/2012 | Chong ............... G06K 9/4652 382/165 |
| 2012/0250948 A1 | 10/2012 | Rickman |
| 2012/0294514 A1 | 11/2012 | Saunders et al. |
| 2013/0039584 A1 | 2/2013 | Harmanci et al. |
| 2014/0270530 A1 | 9/2014 | Dwan et al. |

OTHER PUBLICATIONS

U.S. Appl. No. 13/888,082, Feb. 12, 2016, Office Action.
U.S. Appl. No. 13/888,082, Jul. 27, 2016, Notice of Allowance.

\* cited by examiner

Fig. 11A

| 0.8 | 0.9 |
|-----|-----|
| 0.4 | 0.4 |

Fig. 11B

| 0.4 | 0.4 |
|-----|-----|
| 0.9 | 0.8 |

Fig. 15

| 0 | 1 | 1 | 0 | 1 | 0 | 1 | 0 |
|---|---|---|---|---|---|---|---|
| 1 | 0 | 1 | 1 | 0 | 1 | 0 | 0 |
| 1 | 1 | 0 | 1 | 1 | 1 | 0 | 1 |
| 0 | 1 | 0 | 1 | 0 | 1 | 1 | 0 |
| 1 | 0 | 1 | 1 | 0 | 1 | 0 | 1 |
| 0 | 1 | 0 | 1 | 1 | 1 | 0 | 1 |
| 0 | 1 | 1 | 1 | 0 | 0 | 0 | 1 |
| 0 | 0 | 0 | 1 | 1 | 0 | 1 | 0 |

DUPLICATE/NEAR DUPLICATE DETECTION AND IMAGE REGISTRATION

CROSS-REFERENCE TO RELATED PROVISIONAL APPLICATION

This application is a continuation of U.S. application Ser. No. 13/888,082, filed May 6, 2013 and claims the benefit of U.S. Provisional Patent Application No. 61/800,228, filed on Mar. 15, 2013. Each of the aforementioned application(s) are hereby incorporated by reference in their entirety.

FIELD OF THE INVENTION

Various embodiments of the present invention relate to content management, including duplicate and near duplicate detection.

BACKGROUND

Recent technological advancements in capturing and recording images include features that allow users to capture and record images in rapid succession, often within microseconds or seconds of each other, thus creating large sets of user photos. With the decrease in costs for storage, users often store a large number of their captured photos both on their cameras and in remote storage. Instead of reviewing and organizing photos on the camera or within storage when a user's memory about the recently captured photos is still fresh, users often simply upload the entire set to content management systems to review and organize their captured images at a later date.

As the number of photos both on the camera and within various storage avenues increases, the task of organizing stored photos can become overwhelming. Adding to the complexity of organizing their photos, a given user may also have images from multiple sources, such as, for example, images uploaded to a social network or photograph sharing service, such as Facebook or Instagram, images uploaded to a blog, as well as the original image which remains on his or her computer or digital camera. Or, for example, a user may have photos of essentially the same content, but taken by different persons at a family gathering or social event, which are then shared amongst all of the participants or invitees. If multiple images of the same—or very similar content—are uploaded by such users to content management systems or services, user storage, as well as system bandwidth, may be wasted, as well as uselessly cluttering one's image collection with little marginal benefit. Because users often do not inventory the various photos they upload to such services, or the quality and size of each, they generally have no facility to cull duplicates or near duplicates from their collections of content. Thus, as the number of photos stored for a given user increases, and multiple sources of often redundant content are drawn upon for storage by users, the issue of duplicate and near duplicate content becomes more and more acute. What is thus needed in the art are systems and methods to detect duplicate and near duplicate photos and images, and refer such detected duplications and near duplications to users and/or system resources for appropriate culling or decision making.

SUMMARY OF THE INVENTION

Embodiments are disclosed for detecting duplicate and near duplicate images. An exemplary method includes receiving an original image, preparing the image for fingerprinting, and calculating an image fingerprint, the fingerprint expressed as a sequence of numbers. The method further includes comparing the image fingerprint thus obtained with a set of previously stored fingerprints obtained from a set of previously stored images, and determining if the original image is either a duplicate or a near duplicate of an image in the set if the dissimilarity between the two fingerprints is less than a defined threshold T. Once a duplicate or near duplicate is detected, various defined actions may be taken, including culling the less desirable image or referring the redundancy to a user.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIGS. 11A and 11B depict exemplary pixel intensity matrices in accordance with some embodiments of the invention;

FIG. 15 illustrates an exemplary fingerprinting hash table in accordance with some embodiments of the invention.

DETAILED DESCRIPTION OF THE DISCLOSURE

Methods, systems, and computer readable media for organization and presentation of photos are provided. Content items managed by a content management system may be organized and then presented within a user interface to encourage a user to interact with the system and educate the user on the content items managed by the content management system. Each content item (e.g., images) may be categorized in accordance with similarity rules and organized in clusters with other related (in various defined ways) content items. The clustering performed may use metadata associated with the content items to more accurately sort the images so that the user does not have to rely on memory to sort their own images.

Content items may be clustered on a client device prior to upload to the content management system, upon upload to a content management system, and/or any combination thereof. In some embodiments, content items (e.g., thumbnail or other representation for an image) may be displayed within the user interface with the other content items from the corresponding cluster, with an indicator for the corresponding cluster, and/or with a link to navigate to another user interface to display the cluster.

User interfaces may provide a sample of content items displayed within mosaics with rows and columns. Each row of a mosaic may have content items (e.g., thumbnails or other representations) displayed in temporal sequence. The rows of the mosaic may display content items for a particular unit of time (e.g., years, months, days). The sample may be random or pseudo-random sample of images to ensure that the user is continually educated about the contents within their content management system. A user can then select an image from a sample displayed within the user interface and navigate to a user interface to view the content items clustered with the selected image.

For purposes of description and simplicity, methods, systems and computer readable media will be described for a content storage and management service, and in particular, organization and presentation of content items (e.g., images). However, the terms "content storage service" and "content management system" are used herein to refer broadly to a wide variety of storage providers and management service providers, as well as to a wide variety of types of content, files, portions of files, and/or other types of data. Those with skill in the art will recognize that the methods, systems, and media described for organizing and presenting content items may be used for a variety of storage providers/services and types of content, files, portions of files, and/or other types of data.

Figure 1:
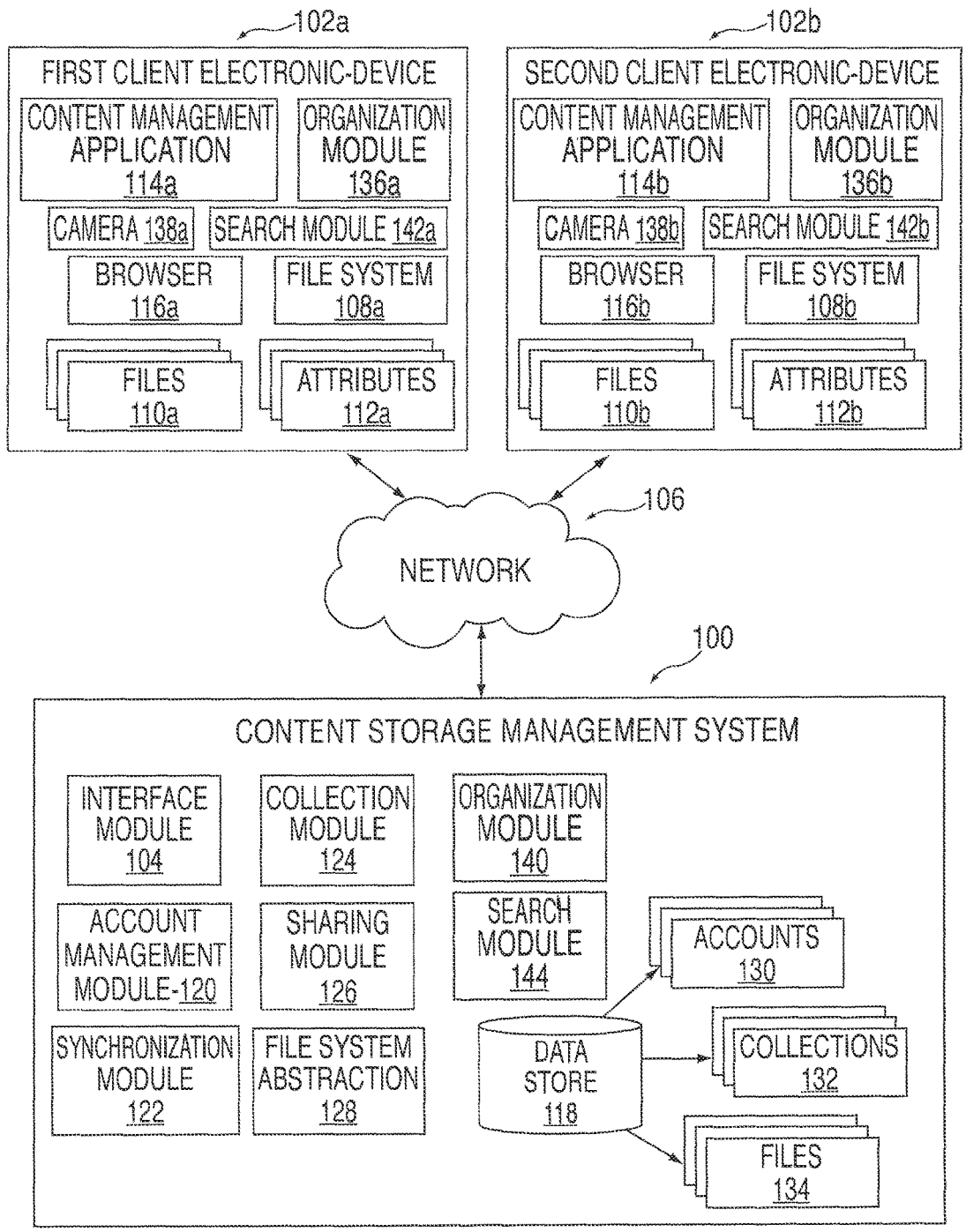
FIG. 1 depicts an exemplary system for presentation and organization of content in accordance with some embodiments of the invention.

FIG. 1 is an exemplary system for presentation and organization of content in accordance with some embodiments of the invention. Elements in FIG. 1, including, but not limited to, first client electronic device 102a, second client electronic device 102b, and content management system 100 may communicate by sending and/or receiving data over network 106. Network 106 may be any network, combination of networks, or network devices that can carry data communication. For example, network 106 may be any one or any combination of LAN (local area network), WAN (wide area network), telephone network, wireless network, point-to point network, star network, token ring network, hub network, or any other configuration.

Network 106 can support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 can communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b, and the revisions to file 110b may be communicated and stored in data store 118 of content management system 100. Optionally, a local copy of the file 110a may be stored on client electronic device 102a.

In particular, client devices 102 may capture, record, and/or store content items, such as image files 110. Client devices 102 may have a camera 138 (e.g., 138a and 138b) to capture and record digital images and/or videos. For example, camera 138 may capture and record images and store metadata with the images. Metadata may include creation time, geolocation, orientation, rotation, title, and/or any other attributes or data relevant to the captured image. Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.

An organizing module 136 (e.g., 136a and 136b) may be used to organize content items (e.g., image files) into clusters, organize content items to provide samplings of content items for display within user interfaces, and/or retrieve organized content items for presentation. The organizing module 136 may utilize any clustering algorithm, including, but not limited to, algorithms implementing at least a portion of the ROCK algorithm and/or any other clustering algorithm. The ROCK algorithm is described in Guha, S., et al., "ROCK: A Robust Clustering Algorithm for Categorical Attributes," Proceedings of the 15$^{th}$ International Conference on Data Engineering (ICDE '99), IEEE Computer Society, Washington, D.C., USA, pp. 512-521 (1999). and is hereby incorporated by reference in its entirety. The organizing module 136 may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organizing module 136 may use the numeric representation as a reference for similarity between content items to cluster the content items.

In some embodiments, content items may be organized into clusters to aid with retrieval of similar content items in response to search requests. For example, organizing module 136a may identify first and second images are similar and may be group the images together in a cluster. Organizing module 136a may process image files to determine clusters independently or in conjunction with counterpart organizing module (e.g., 140 and/or 136b). In other embodiments, organizing module 136a may only provide clusters identified with counterpart organizing modules (e.g., 140 and/or 136b) for presentation. Continuing with the example, processing of image files to determine clusters may be an iterative process that is executed upon receipt of new content items and/or new similarity rules.

In some embodiments, a search module 142 on client device 102 is provided with counterpart search module 144 on content management system 144 to support search for content items. A search request may be received by search module 142 and/or 144 that requests a content item for a particular date, and the search may be handled by searching cluster markers of stored images. In particular, cluster markers may indicate an approximate time or average time for the images stored with the cluster marker in some embodiments, and the marker may be used to speed the search and/or return the search results with the contents of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112a and 112b (collectively 112) or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112a and 112b may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114a and 114b (collectively 114), client application, and/or third-party application may be implemented to provide a user interface for a user to interact with content management system 100. Content management application 114 may expose the functionality provided with content management interface 104. Web browser 116a and 116b (collectively 116) may be used to display a web page front end for a client application that can provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organizing module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have a organizing module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 can be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 124 can interact with any number of other modules of content management system 100.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

Content items (e.g., files 110) can be stored in data store 118. Data store 118 can be a storage device, multiple storage devices, or a server. Alternatively, data store 118 can be cloud storage provider or network storage accessible via one or more communications networks. Content management system 100 can hide the complexity and details from client devices 102 by using a file system abstraction 128 (e.g., a file system database abstraction layer) so that client devices 102 do not need to know exactly where the content items are being stored by the content management system 100. Embodiments can store the content items in the same folder hierarchy as they appear on client device 102. Alternatively, content management system 100 can store the content items in various orders, arrangements, and/or hierarchies. Content management system 100 can store the content items in a network accessible storage (SAN) device, in a redundant array of inexpensive disks (RAID), etc. Content management system 100 can store content items using one or more partition types, such as FAT, FAT32, NTFS, EXT2, EXT3, EXT4, ReiserFS, BTRFS, and so forth.

Data store 118 can also store metadata describing content items, content item types, and the relationship of content items to various accounts, folders, collections, or groups. The metadata for a content item can be stored as part of the content item or can be stored separately. Metadata can be store in an object-oriented database, a relational database, a file system, or any other collection of data. In one variation, each content item stored in data store 118 can be assigned a system-wide unique identifier.

Data store 118 can decrease the amount of storage space required by identifying duplicate files or duplicate chunks of files. Instead of storing multiple copies, data store 118 can store a single copy of a file 134 and then use a pointer or other mechanism to link the duplicates to the single copy. Similarly, data store 118 can store files 134 more efficiently, as well as provide the ability to undo operations, by using a file version control that tracks changes to files, different versions of files (including diverging version trees), and a change history. The change history can include a set of changes that, when applied to the original file version, produce the changed file version.

Content management system 100 can be configured to support automatic synchronization of content from one or more client devices 102. The synchronization can be platform independent. That is, the content can be synchronized across multiple client devices 102 of varying type, capabilities, operating systems, etc. For example, client device 102a can include client software, which synchronizes, via a synchronization module 122 at content management system 100, content in client device 102 file system 108 with the content in an associated user account. In some cases, the client software can synchronize any changes to content in a designated folder and its sub-folders, such as new, deleted, modified, copied, or moved files or folders. In one example of client software that integrates with an existing content management application, a user can manipulate content directly in a local folder, while a background process monitors the local folder for changes and synchronizes those changes to content management system 100. In some embodiments, a background process can identify content that has been updated at content management system 100 and synchronize those changes to the local folder. The client software can provide notifications of synchronization operations, and can provide indications of content statuses directly within the content management application. Sometimes client device 102 may not have a network connection available. In this scenario, the client software can monitor the linked folder for file changes and queue those changes for later synchronization to content management system 100 when a network connection is available. Similarly, a user can manually stop or pause synchronization with content management system 100.

A user can also view or manipulate content via a web interface generated and served by user interface module 104. For example, the user can navigate in a web browser to a web address provided by content management system 100. Changes or updates to content in the data store 118 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 100 can include sharing module 126 for managing sharing content and/or collections of content publicly or privately. Sharing content publicly can include making the content item and/or the collection accessible from any computing device in network communication with content management system 100. Sharing content privately can include linking a content item and/or a collection in data store 118 with two or more user accounts so that each user account has access to the content item. In particular, the sharing module 126 can be used with the collections module 124 to allow sharing of a virtual collection with another user or user account. The sharing can be performed in a platform independent manner. That is, the content can be shared across multiple client devices 102 of varying type, capabilities, operating systems, etc. The content can also be shared across varying types of user accounts. A lightweight share, akin to a virtual collection, may be a grouping of content identifiers that may be stored in various locations within file system of client device 102 and/or stored remotely at content management system 100.

In some embodiments, content management system 100 can be configured to maintain a content directory or a database table/entity for content items where each entry or row identifies the location of each content item in data store 118. In some embodiments, a unique or a nearly unique content identifier may be stored for each content item stored in the data store 118.

Metadata can be stored for each content item. For example, metadata can include a content path that can be used to identify the content item. The content path can include the name of the content item and a folder hierarchy associated with the content item (e.g., the path for storage locally within a client device 102). In another example, the content path can include a folder or path of folders in which the content item is placed as well as the name of the content item. Content management system 100 can use the content path to present the content items in the appropriate folder hierarchy in a user interface with a traditional hierarchy view. A content pointer that identifies the location of the content item in data store 118 can also be stored with the content identifier. For example, the content pointer can include the exact storage address of the content item in memory. In some embodiments, the content pointer can point to multiple locations, each of which contains a portion of the content item.

In addition to a content path and content pointer, a content item entry/database table row in a content item database entity can also include a user account identifier that identifies the user account that has access to the content item. In some embodiments, multiple user account identifiers can be associated with a single content entry indicating that the content item has shared access by the multiple user accounts.

To share a content item privately, sharing module 126 can be configured to add a user account identifier to the content entry or database table row associated with the content item, thus granting the added user account access to the content item. Sharing module 126 can also be configured to remove user account identifiers from a content entry or database table rows to restrict a user account's access to the content item. The sharing module 126 may also be used to add and remove user account identifiers to a database table for virtual collections.

To share content publicly, sharing module 126 can be configured to generate a custom network address, such as a uniform resource locator (URL), which allows any web browser to access the content in content management system 100 without any authentication. To accomplish this, sharing module 126 can be configured to include content identification data in the generated URL, which can later be used to properly identify and return the requested content item. For example, sharing module 126 can be configured to include the user account identifier and the content path in the generated URL. Upon selection of the URL, the content identification data included in the URL can be transmitted to content management system 100 which can use the received content identification data to identify the appropriate content entry and return the content item associated with the content entry.

To share a virtual collection publicly, sharing module 126 can be configured to generate a custom network address, such as a uniform resource locator (URL), which allows any web browser to access the content in content management system 100 without any authentication. To accomplish this, sharing module 126 can be configured to include collection identification data in the generated URL, which can later be used to properly identify and return the requested content item. For example, sharing module 126 can be configured to include the user account identifier and the collection identifier in the generated URL. Upon selection of the URL, the content identification data included in the URL can be transmitted to content management system 100 which can use the received content identification data to identify the appropriate content entry or database row and return the content item associated with the content entry or database row.

In addition to generating the URL, sharing module 126 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 126 can be configured to change the value of the flag to 1 or true after generating a URL to the content item.

In some embodiments, sharing module 126 can also be configured to deactivate a generated URL. For example, each content entry can also include a URL active flag indicating whether the content should be returned in response to a request from the generated URL. For example, sharing module 126 can be configured to only return a content item requested by a generated link if the URL active flag is set to 1 or true. Changing the value of the URL active flag or Boolean value can easily restrict access to a content item or a collection for which a URL has been generated. This allows a user to restrict access to the shared content item without having to move the content item or delete the generated URL. Likewise, sharing module 126 can reactivate the URL by again changing the value of the URL active flag to 1 or true. A user can thus easily restore access to the content item without the need to generate a new URL.

Variation in Identical/Similar User Uploaded Content

Figure 2:
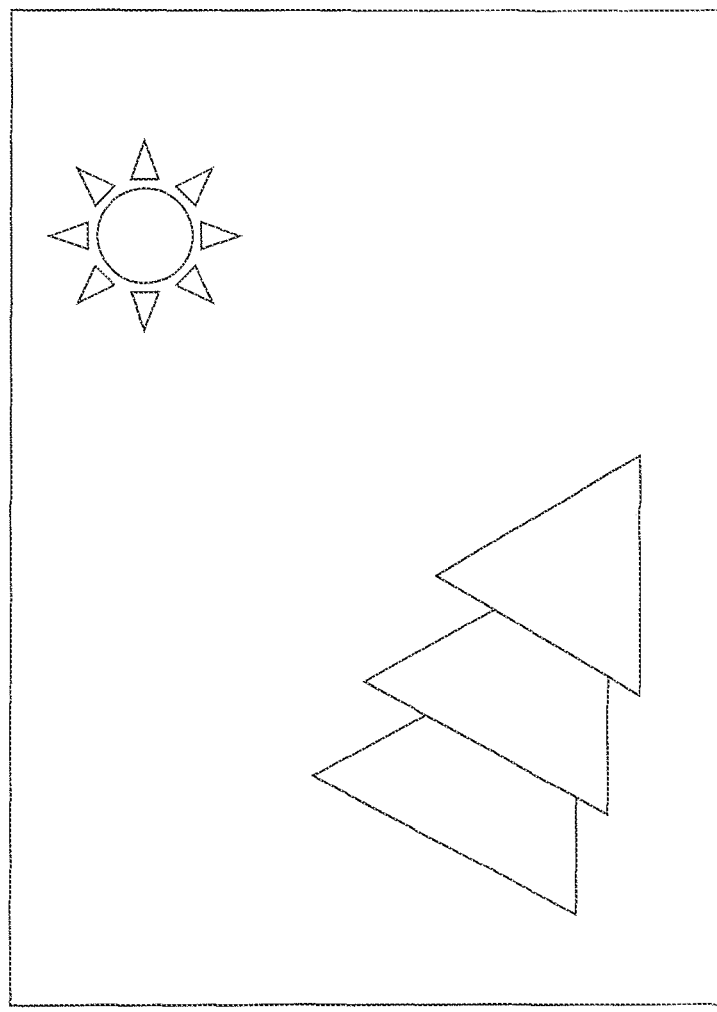
FIG. 2 is a schematization of an exemplary photograph that may be used in accordance with some embodiments of the invention.

FIGS. 2 through 10, next described, illustrate some of the difficulties in detecting duplicate photographs or images. With reference to FIG. 2, there is seen a simplified representation of a photograph or image. The example photograph has a set of mountains at the bottom left and a shining sun at the upper right. The task faced by a content management system or other entity or system seeking to implement duplicate detection is, having already uploaded the photograph shown in FIG. 2, how to detect when a duplicate of it is uploaded, such as that shown in FIGS. 3 to 10.

Figure 10:
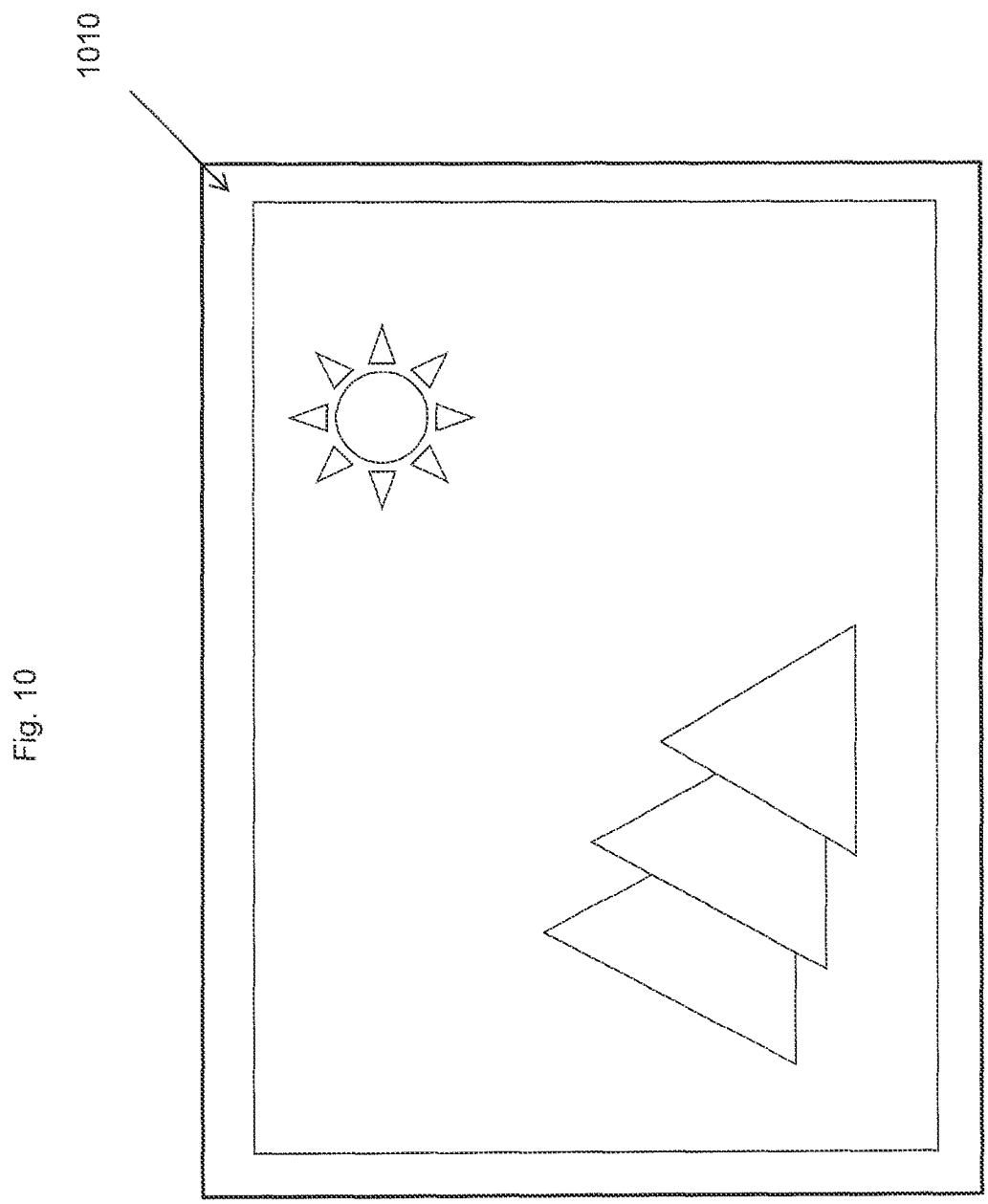
FIG. 10 illustrates the schematized photograph of FIG. 2 with a border added around its perimeter.

It is noted that in exemplary embodiments of the present invention either (i) exact duplicates can be detected and dealt with, or acting more aggressively, (ii) both duplicates and near duplicates can be detected and dealt with. As used herein, the term "duplicate" is considered to be the same image as another. Perhaps in a different size, perhaps in having been given a border (such as is shown in FIG. 10), or perhaps presented in a different orientation (such as is shown in FIGS. 3 through 6), but otherwise having the identical content as the original. A "near duplicate" is considered to be a similar image, having similar content, but not identical content. A near duplicate may arise when a user acquires a number of images in rapid succession, such as may occur when a photographer shoots a model who is moving, or where the user's camera was moved slightly between shots. In a near duplicate the elements composing the depicted scene are the same but the scene itself is slightly different. In various exemplary embodiments of present invention, a content management system, or other system or process for which it is important to detect a duplicate, may want to only deal with exactly duplicates. In other exemplary embodiments an exemplary system may want to also detect near duplicates, and take similar, or perhaps different action in response, relative to duplicate handling.

Accordingly, the methods described herein applied to both duplicate and near duplicate detection. The main question is how aggressively one defines two images as being "similar" enough to be either duplicates or near duplicates, and what thresholds of similarity are required to consider the images close enough to be dealt with in this way.

Figure 3:
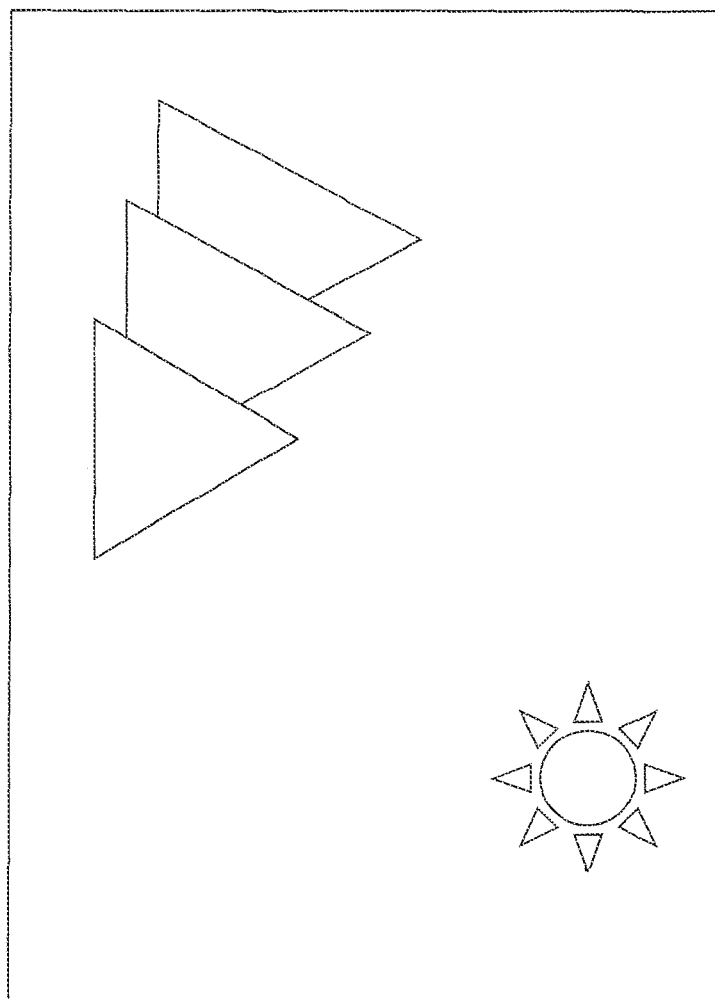
FIG. 3 illustrates the schematized photograph of FIG. 2 rotated 180°.
Figure 4:
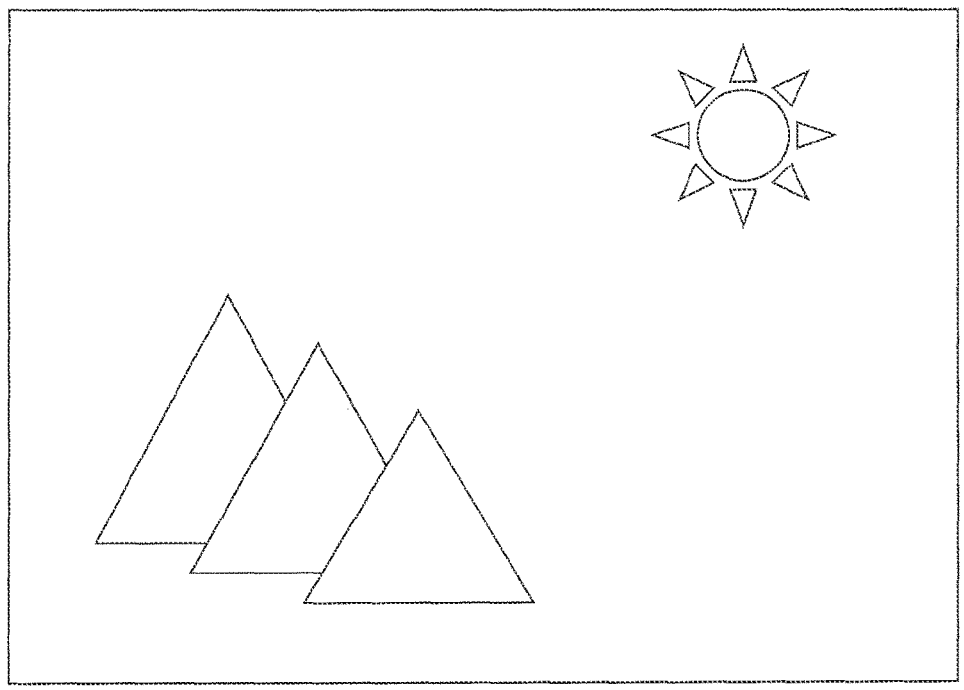
FIG. 4 illustrates the schematized photograph of FIG. 2 rotated 90°.

Returning to FIG. 3, FIG. 3 is the identical image as shown in FIG. 2 except that it has been rotated 180 degrees. Therefore, the image of FIG. 3 is completely upside down with right and left sides of the scene switched relative to the image of FIG. 2. Both a duplicate detection and a near duplicate detection system would want to be able to detect FIG. 3 and FIG. 2 as being identical. Continuing with reference to FIG. 4, FIG. 4 is the interim position between that of FIGS. 2 and 3. Here the image of FIG. 2 has been rotated approximately 90 degrees. In exemplary embodiments of the present invention both images 3 and 4 would desirably be identified as complete duplicates of that of FIG. 2.

Figure 5:
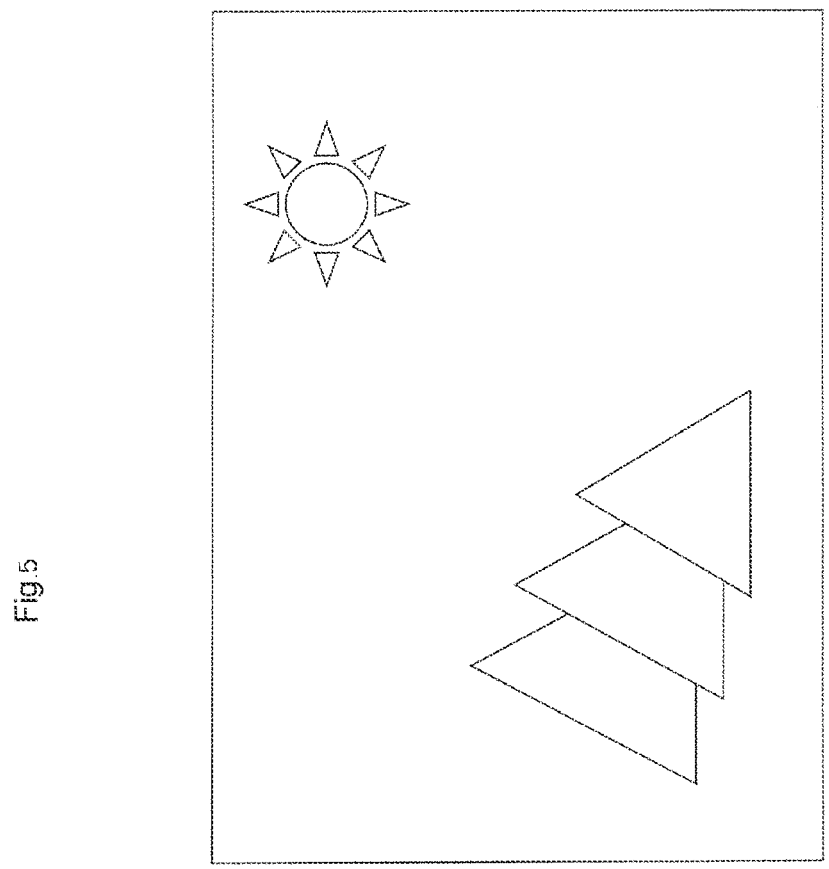
FIG. 5 illustrates the schematized photograph of FIG. 2 rotated approximately 15°.
Figure 6:
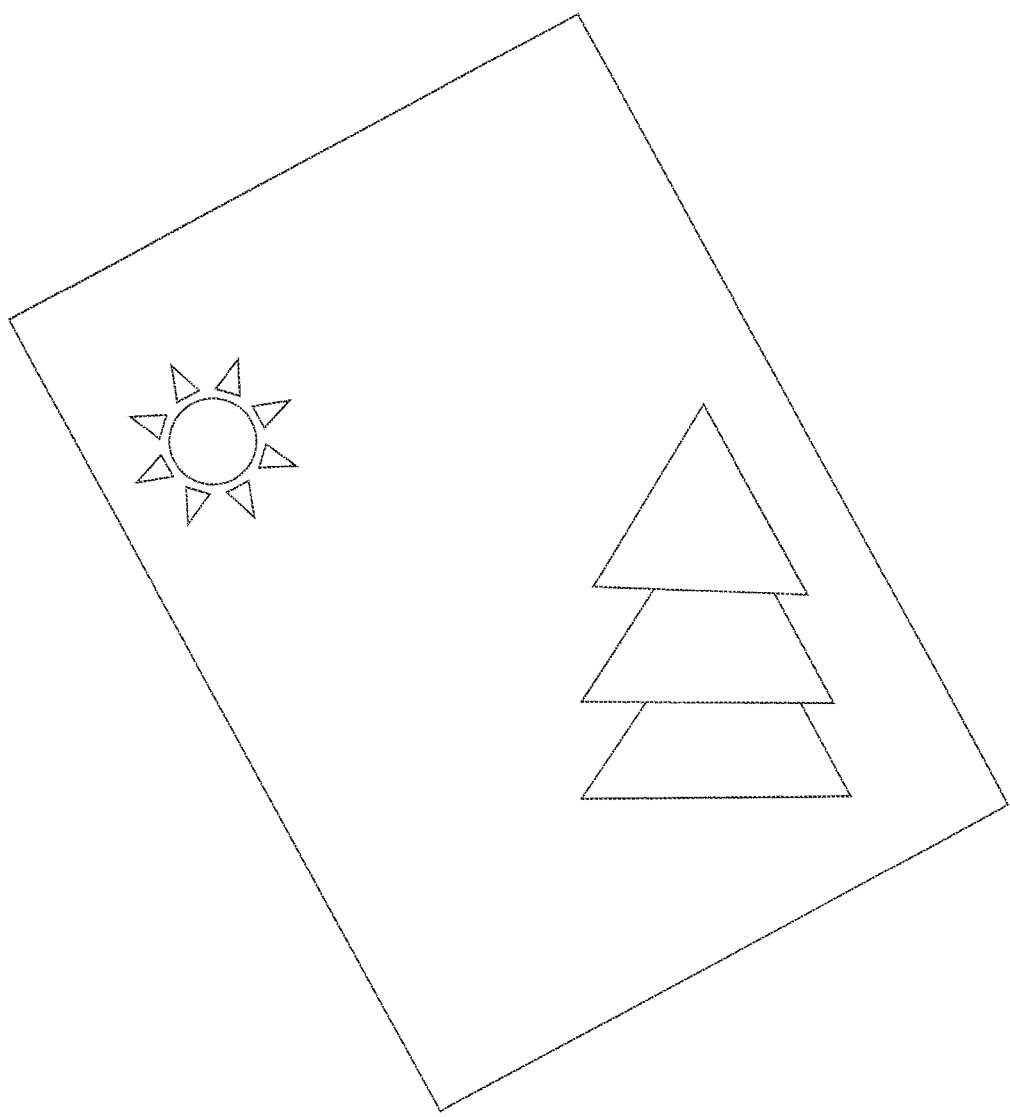
FIG. 6 illustrates the schematized photograph of FIG. 2 rotated −45°.

FIGS. 5 and 6 are also identical images with that shown in FIGS. 2 through 4. FIG. 5 has been rotated maybe 30 degrees relative to FIG. 2, and FIG. 6 shows an image rotated approximately −45 degrees relative to FIG. 2. Thus, in exemplary embodiments of the present invention all of FIGS. 2 through 6 should be considered as duplicates and so detected.

Figure 7:
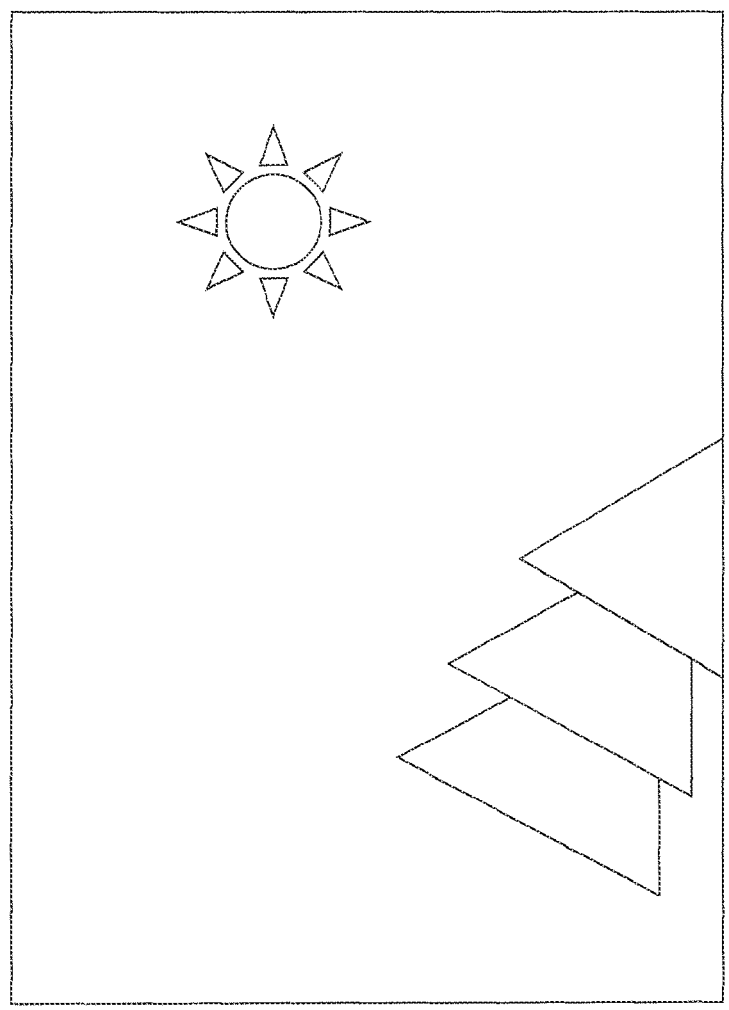
FIG. 7 illustrates a similar schematized photograph as that of FIG. 2 where the camera has moved up.
Figure 8:
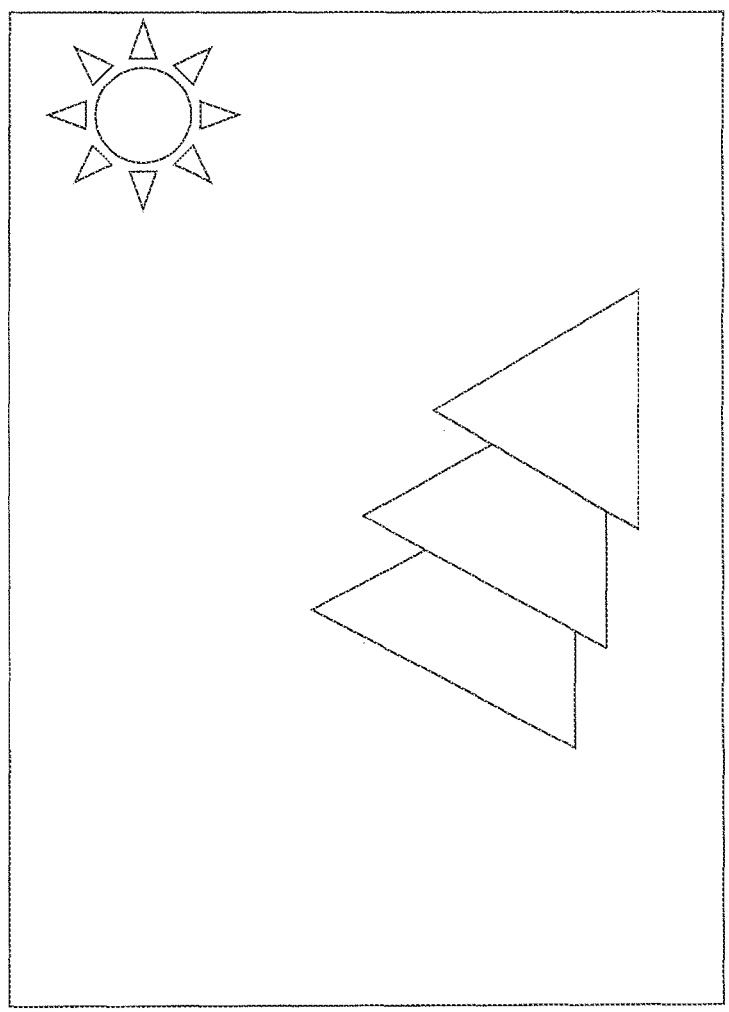
FIG. 8 illustrates a similar schematized photograph as that of FIG. 2 where the camera has moved to the left.
Figure 9:
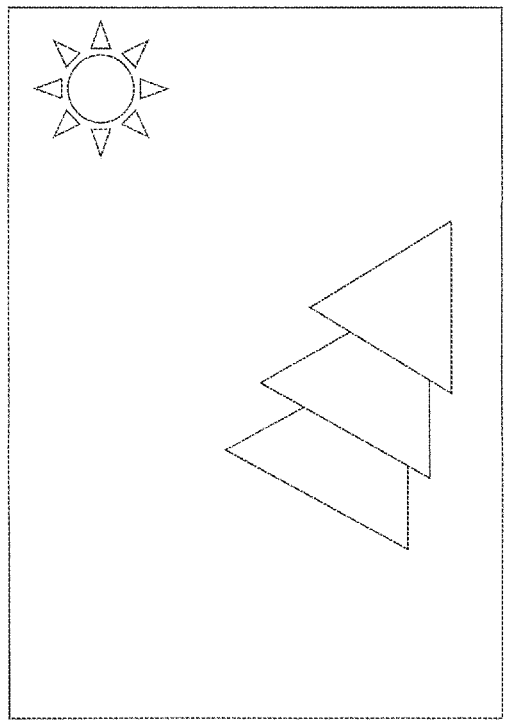
FIG. 9 illustrates the schematized photograph of FIG. 8 rotated −45°.

FIGS. 7, 8 and 9 illustrate not absolute duplicates but exemplary near duplicates. With reference to FIG. 7, FIG. 7 presents the same content as shown in FIG. 2 except that the camera has been moved upwards such that both the mountains on the bottom left, and the sun in the top right, have translated towards the bottom of the field of view. This is not a duplicate in the strictest sense because the pixel content is different, and the view of the scene relative to the frame of the camera is different. However, the essential elements of the content remain the same, just that the mountains are not fully seen as they were before and certainly the foreground of the mountains is not seen at all and more of the sky above the position of the sun is seen. So images 2 through 6 on the one hand and that of FIG. 7 on the other are actually different. Similarly, FIG. 8 shows the image of FIG. 2 where the camera has been moved to the left relative to the image taken in FIG. 2, and thus the main elements sun and mountains have moved to the right of the frame. Thus, although the content is similar and both the sun and the mountains are visible, more of the field of view to the left of the mountains is seen and less of the field to the right of the sun is seen, relative to FIG. 2. In fact, in FIG. 8 the sun is positioned completely at the edge of the frame.

Finally, FIG. 9 shows the scene of FIG. 8 (the leftward translation of the camera relative to FIG. 2) with added rotation of the image as if the camera was also rotated, or for example, as if a user chose to rotate the photograph in this way when she stored it, such as, for example, on Instagram or other photo sharing services that allow a user to define a degree of rotation. Thus, the images shown in FIGS. 9 and 8 are in fact duplicates, and each of them, relative to the images in FIGS. 2 through 6, are near duplicates. Thus, in exemplary embodiments of the present invention, FIG. 7 on the one hand, and FIGS. 8 and 9 on the other, would be considered near duplicates, whereas FIGS. 8 and 9 would be considered duplicates of each other, only having differing rotation.

Finally, with reference to FIG. 10, the results of a process that is used by some social media and photograph sharing services, such as, for example, Instagram, is shown. Instagram allows adding a border around an image. The border can be all white, so as to appear as a polaroid photo, or can have an outer white border with a smaller inner border of black, to appear as a framed painting, for example. The image of FIG. 10 is identical to that of FIG. 2. However, taking the image or the photo of FIG. 10 as a whole, it has an added perimeter of pixels, either of the same color or perhaps comprising a design that is not found in FIG. 2. Alternatively, the border can replace an equivalent amount of pixels along the perimeter, and thus effectively change the intensity and color values of such perimeter pixels. Having loaded the image of FIG. 10 to a content management system, for example, the system may very well want to detect the identity of the portion within the border with the photograph shown in FIG. 2. Although, due to change in actual pixel values the two images are strictly only near duplicates, most users would consider keeping both of them redundant, and unnecessary.

Thus, FIGS. 2 through 10 illustrate examples of various types of duplicate or near duplicate photographs and images that may be detected according to various exemplary embodiments of the present invention. In order for duplicates to be detected, therefore, as can be appreciated by looking at FIGS. 2 through 10, before any comparison images have to be normalized as to size and as to orientation. Thus, in exemplary embodiments of the present invention, an image, once uploaded may be prepared in various ways prior to obtaining a "fingerprint" of the image. A fingerprint can be understood as a signature of the image by which the image is substantially uniquely identified. Thus, as next described, a mathematical construct can be generated from every photograph or image uploaded to a content management system and that construct, known as a fingerprint or signature, can be compared with the fingerprint or signature of any other photograph or image uploaded to the system for the purposes of detecting duplicates and/or near duplicates. Because in order to extract a fingerprint consistent with comparison to a set of other fingerprints, an image may preferably be arranged to have a standard size and a standard orientation, images smaller than the normal, or system standard, size may be expanded and images that are larger than the system standard size may be compressed to fit the standard size.

Furthermore, if images come in sizes that are more rectangular than square, or vice versa, using a square standard size for the purposes of calculating or generating the fingerprint, or using a rectangular standard size, will either squish together or expand along the longer dimension (generally the height of the image, but can vary) the pixels of the original image. Because this tends to either require interpolation (for increasing size) or down sampling (for decreasing size), there has to be some tolerated dissimilarity between fingerprints in order to even capture actual complete duplicates, as described below. It goes without saying that because the standardization process prior to fingerprinting introduces variation from an original, even more dissimilarity may be tolerated to capture near duplicates, which already have inherent dissimilarity inter se.

Thus, in exemplary embodiments of the present invention, an original photograph may be uploaded to the system, the original can be prepared for fingerprinting, and once the image has been prepared, the fingerprint of the image can be calculated and then stored. Once stored, the fingerprint can be compared with all other fingerprints of some defined set of images already stored on the system, so as to detect a duplicate or near duplicate of the newly uploaded photograph, among those already stored. If a duplicate or near duplicate is found, appropriate action may be taken, including, for example, automatically discarding one of the duplicates/near duplicates using defined system rules, or alerting a user and soliciting a choice by the user as to whether to keep both, or whether to discard a selected one. Alternatively, both the new image and its fingerprint may be stored, and at some later time (such as, for example, during low traffic hours) the system may locate duplicates and near duplicates and take appropriate action.

Sets of Previously Stored Images to Test Against

Given that content management systems in general have both large amounts of photographs and large numbers of users, it would be most efficient to cull all duplicates across the entire user base and store only those photos that are absolutely "system" unique. In the case of culling near duplicates, an exemplary system would be able to store even a smaller number of photographs across an entire user base. There are a few problems with that approach, however. Assuming that a nature photographer routinely sells well composed photographs to National Geographic, stores in his account on the content management system a number of highly valuable photographs. Assume further that another user pulled one of the images, maybe a smaller version from a Facebook posting or an Instagram posting or from an online version of National Geographic magazine or an advertisement, the same photo in a different size and a lesser quality. Once the second user uploads to his account on the content management system, that lesser quality, smaller version of the original photograph and the system were to detect that it is a duplicate of a better, clearer and larger version of the same photograph in the account of the nature photographer, if the system then culls the newly uploaded photograph and allows the second user's account to have a point to the photographs stored in the nature photographer's account there could be numerous instances of copyright violations as well as pilfering the hard work of other users without competition or merit or the right to do so. Thus, although it is possible, and one skilled in the art will readily understand, that for various purposes a content management system may allow duplicate and near duplicate detection across multiple users, in some exemplary embodiments this functionality may only operate within a specific user account, or within a group of linked users accounts, such as, for example, family and friends, or members of an enterprise, company or entity where sharing of content is allowed and encouraged. For the remainder of this disclosure it will be assumed that such restrictions are in effect and that content is only searched against the other content of a user or a related user, it being understood that the same processes and systems may be used if such restrictions are relaxed.

Details of Fingerprint Generation

As noted above, in order to search for duplicates, a fingerprint or signature of every photograph uploaded to an exemplary content management system may be generated. As also noted above, in order to generate a fingerprint, photographs are preferably in a system standard size and orientation, otherwise comparison of fingerprints would generally be much more complex. Thus, FIG. 11 illustrates an initial step of normalizing the rotation of each photograph to a standard rotation so that fingerprints can be generated. This allows the images of FIGS. 2, 3, 4, 5, 6, for example, as well as the images of FIGS. 8 and 9 to have the same, or very similar, fingerprints.

In exemplary embodiments of the present invention, a photograph may first be resized to a standard N by M pixel array. In exemplary embodiments of the present invention that array can be 512×512, 1024×1024 or a similar size, where each side is a power of two number of pixels. It need not be a square array, but in some exemplary embodiments this is convenient. Further, it is understood that such a standard size pixel array may be an arbitrary number of pixels, such as 713×713 or 642×600, for example, or, for example, an array that implements a 4:3 size ratio, so as to accommodate smartphones and other devices that may utilize this size ratio. Once resized, it remains necessary to correct the orientation of a photograph, and this can be done by detecting the proper orientation using intensity or brightness values, or an equivalent metric, of the various regions of the photograph or image. For example, FIG. 11 shows a 2×2 array which is super-imposed on the now resized photograph having M×N pixels. Each cell of the 2×2 array has M/2 by N/2 pixels, and thus where M=N={512, 1024, etc.}, each quadrant may be a square of size 256×256, or 512×512 pixels, for example. If powers of two are used for the dimensions of the M×N standard photograph size, it is easy to divide up the area of the photograph into 4 quadrants or 8 octants, and 16 cells, for example, but it is understood that this is not necessary. Other arrays can be used besides 2×2, 3×2 and 4×4, as may be convenient. The average intensity of all the pixels in each cell, or other convenient metric, for example, may then be taken and compared with those of each of the other cells.

In exemplary embodiments of the present invention, it can be assumed that a higher pixel intensity reflects an upper portion of the photograph and a lower pixel intensity reflects a lower portion of the photograph, inasmuch as objects that are standing nearer the ground are darker than those that are against the sky, and certainly darker than the sky itself which generally appears at the top of outdoor photos. Moreover, for indoor photos, indoor lighting is generally provided in ceilings or on the upper portions of walls. Since most furniture does not extend from floor to ceiling, and most walls are not painted dark colors, generally lighter pixels appear at the top of photographs properly oriented and darker pixels appear at the bottoms of photographs properly oriented.

Figures 11A, 11B:
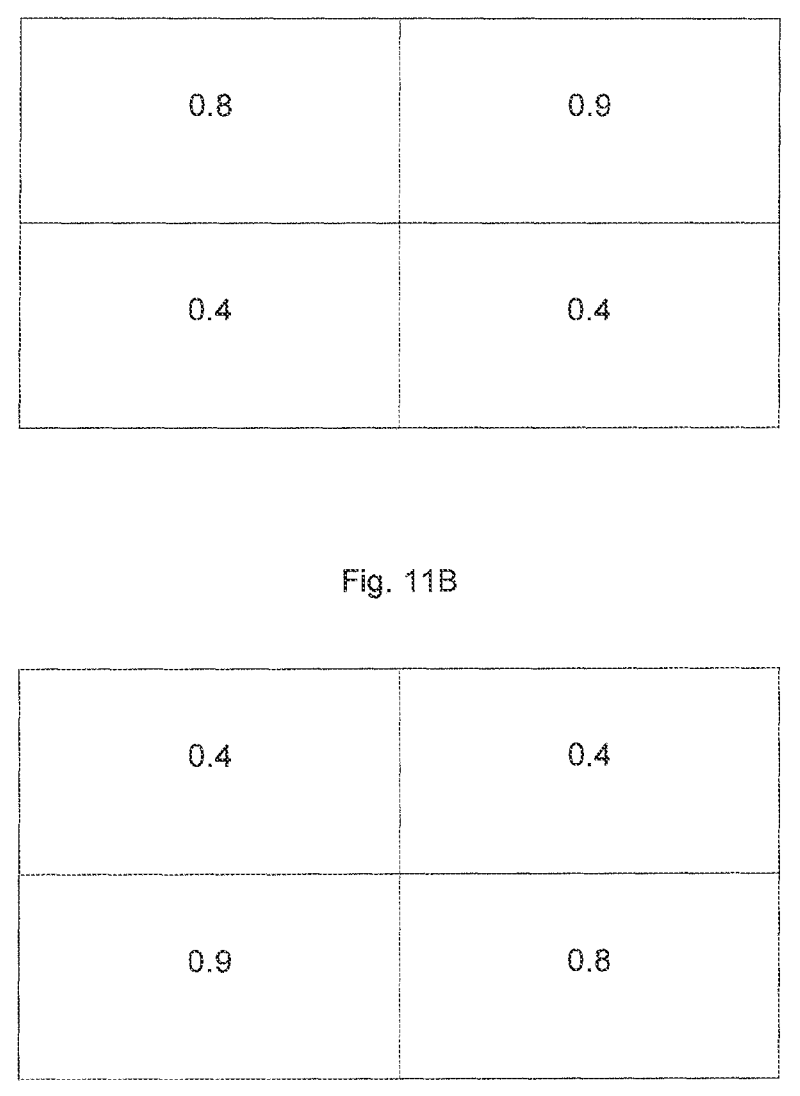

Therefore, it may be a convenient metric to divide the resized photograph or image into a number of equally sized quadrants, for example, as shown in FIG. 11, take the average pixel intensity within each quadrant and orient the photograph such that the lighter intensities appear on the top. Assuming that this is the case, FIG. 11 show an exemplary set of average pixel intensity values for four quadrants superimposed on a system standard 512×512 pixel resized photograph according to an exemplary embodiment of the present invention. The upper matrix of FIG. 11A is derived from FIG. 2, and the lower matrix of FIG. 11B is derived from FIG. 3. As can be seen just as FIG. 3 is a result of a 180 degree rotation of FIG. 2, FIG. 11B, the average pixel intensity matrix derived from FIG. 3 is simply the average pixel intensity matrix of FIG. 11A rotated 180 degrees. Thus, pixel intensity matrices may be conveniently used as proxies for images in determining a standard orientation.

It is noted that alternatively, an exemplary system may, for example, measure pixel darkness, or orient using lower pixel intensities, using the same assumption, i.e., that darker pixels are generally at the bottom of an image. It is further noted that, in general, use of pixel intensity of a region, relative to adjacent regions of an image, will facilitate proper orientation, even if two copies of an image have been filtered, such as is sometimes done using custom filters, such as, for example, on Instagram. In the case where such filtering serves to invert pixel intensities, then two similar or identical images where one has had pixel intensities so modified will not be seen as duplicates, and rather, it may be assumed that inasmuch as the user took pains to generate a highly filtered effect, that is considered as a different image.

By this method, namely, resizing to a standard M×N photograph size, and calculating the average pixel intensities in each cell of a set of divisions of the resized photograph or image, it is possible to orient each and every photograph to a standard orientation, as in the case of FIGS. 11A and 11B, the upright orientation. Thus, given the average pixel intensity matrix of FIG. 11B, in exemplary embodiments of the present invention the underlying image would be rotated back to the standard rotation of FIG. 11A. Then the two photographs (i.e., FIGS. 2 and 3) from which the respective matrices of FIG. 11 were generated, may then be processed to generate fingerprints, and may be compared for duplicity or near duplicity.

Figure 12:
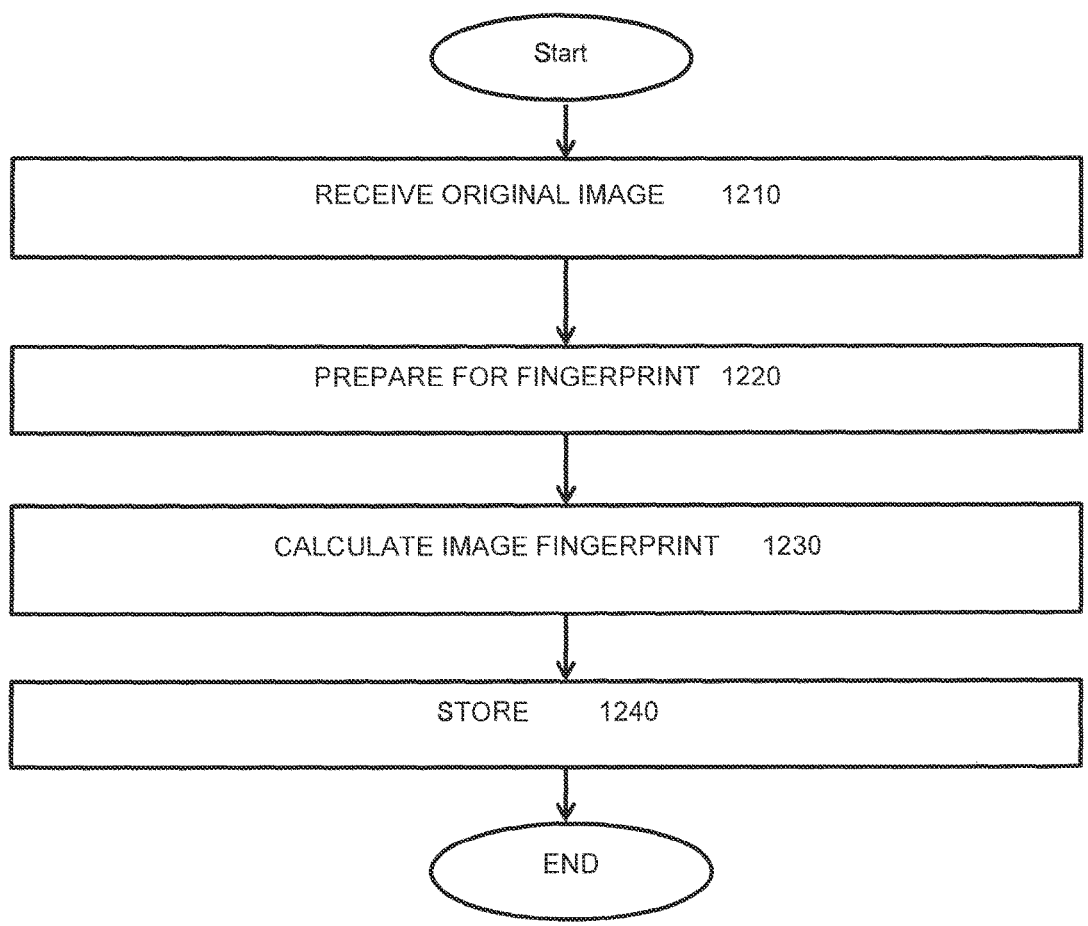
FIG. 12 depicts exemplary process flow for receiving, fingerprinting and storing image fingerprints in accordance with some embodiments of the invention.

FIG. 12 is an exemplary process flow chart for precisely the steps just described. An original image is received by a system at 1210, and at 1220 it may be prepared for fingerprinting. Once it is so prepared, at 1230 an image fingerprint may be calculated. Finally, at 1240, the image fingerprint is stored in the system.

Figure 13:
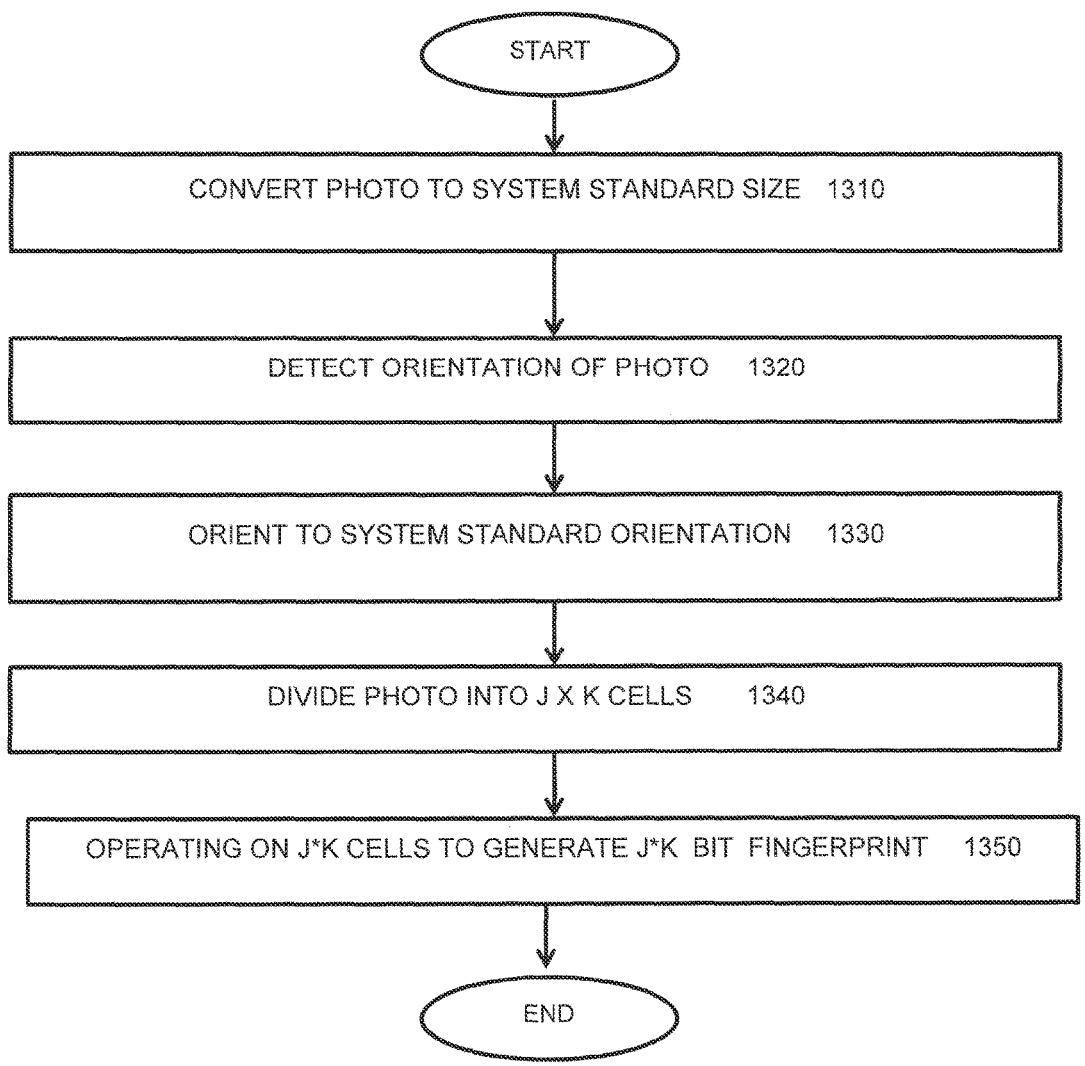
FIG. 13 provides further details of the preparation for fingerprinting and calculation of image fingerprint processes of FIG. 12 in accordance with some embodiments of the invention.

As noted above, to prepare for fingerprinting, in exemplary embodiments of the present invention, the photograph may be resized to a system standard size and rotated to a system standard orientation. This process is shown, for example, at 1220 and 1230, and elaborated upon in the process flow chart of FIG. 13. With reference thereto, FIG. 13 shows an exemplary process where, at 1310, a photograph is converted to a system standard size, namely an M×N array. As noted above, this M×N array can be a 512×512 pixel photograph. From there process flow moves to 1320 where the orientation of the photograph is detected, as described above in connection with FIG. 11. Once the orientation of each photograph has been detected, it may be reoriented to a system standard orientation at 1330 which may be, for example, the orientation most reflective of reality where objects are standing on the ground and above them is the sky or the top of a room or other structure. In other words, objects and people are orientated with their feet or infrastructure on the ground and extending upwards, just as in real life. Once the photograph has been oriented to a system standard orientation at 1330, the photograph may be divided into J×K cells, to calculate the fingerprint. Thus, at 1340, the image is divided into J×K cells for calculation of the fingerprint. This is contemplated to be a much larger number of cells than were used to correct to standard orientation. For example, it can be an 8×8 array of cells, superimposed upon the 512×512 pixel array which is the resized photograph. Thus, using a system standard image size of M×N pixels and, at 1340, a fingerprint cell array of 8×8, each cell in the resulting array will have 64×64 or 4096 pixels (out of a total 262,144 pixels in the resized photograph). This is illustrated in FIG. 16 which shows an 8×8 array derived from a system standard 512×512 pixel size for all photographs. At 1350, each cell of the J*K total number of cells (in the example of FIG. 16, 64 cells) is assigned either a one or a zero, for example, once again based on pixel intensity within the cell. Other metrics besides average pixel intensity may be used, such as, for example, geometric means, or other metrics that serve to distinguish the relative brightness of image sectors. Where the images being saved and evaluated are much more similar in composition, such as, for example, medical imaging soft copies, it is understood that more sensitive (and thus complex) metrics may be used to create a unique image fingerprint. For standard consumer photographs and the like, an 8×8 array, assigning one bit to each cell works well. Thus, in each cell of the exemplary J×K array, a number, or numbers, may be assigned to that cell. The aggregate of all such values comprise the fingerprint of the photograph or image. Thus, where J=K=8, for example, a 64 bit fingerprint is generated at 1350 and processing then ends. It is this fingerprint that may be compared with all other fingerprints in the system to detect duplicates and near duplicates.

The way the duplicates are detected is by setting a threshold of allowed dissimilarity of bits between two fingerprints in an exemplary system. As noted above, because all images are resized, and the original images may have been the same photograph but different sizes, with different granularities, of the exact same scene, if we only allow identical fingerprints to determine duplicate photographs, many actual duplicates would not be detected and the benefit of duplicate detection would not be realized. Therefore, in exemplary embodiments of the present invention, a threshold T can be applied which is the maximum number of nonequal cell values for fingerprints. Where each cell is associated with a single bit, as shown in the example of FIG. 15, T is a maximum number of bits of the fingerprint that are allowed to be different and still categorize the underlying images as duplicates. This is known sometimes as a Hamming distance, for example. In the example of FIG. 15, one can set the threshold anywhere between, for example, 9 and 20, or higher. Obviously at a distance of 32 bits, or half the overall possible bits, the notion of similarity starts to fade. A lower threshold will detect duplicates that really look the same and a higher threshold value, such as 22 or 25, will aggressively consider essentially duplicate photographs or near duplicates as substantially repetitive of each other. In either case, upon discovery of a duplicate or near duplicate, the newly uploaded image and its duplicate(s) can be tagged and possibly culled, or tagged for further action.

Figure 14:
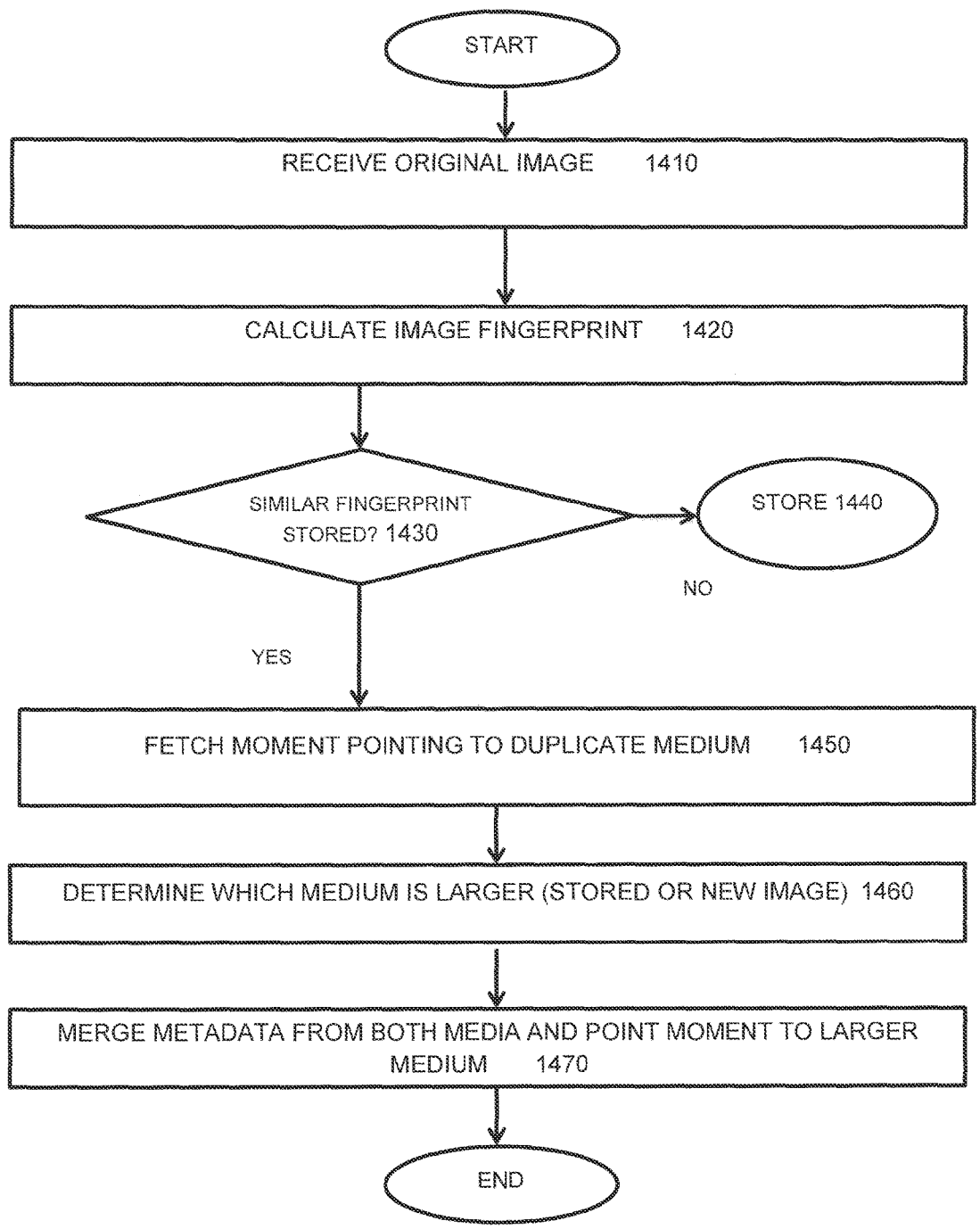
FIG. 14 depicts exemplary process flow for receiving an image, calculating its fingerprint and processing upon discovery of a previously stored version of the same image in accordance with some embodiments of the invention.

FIG. 14 illustrates an exemplary overall process flow taking into account all of the components and elements described above. With reference thereto, beginning at start, process flow moves to 1410 where an original image is received. Using the processes described above, such as, for example, in FIGS. 12 and 13, an image fingerprint may be calculated at 1420. Moving to 1430, the fingerprint as calculated in 1420 may be compared with all the fingerprints for either that user, or, for example, a relevant group of users, or the entire system, as the case may be, to see if a similar fingerprint has already be stored. It is here noted that the notion of "similarity" in this sense is, once again, dependent upon where the threshold value T is set, as described above. If NO at 1430, then the fingerprint calculated in 1420 is stored at 1440 and process flow ends. If at 1430 the answer is YES, then process flow moves to 1450 and the moment (described below) pointing to the duplicate medium may be fetched.

In exemplary embodiments of the present invention, a fingerprint may be part of a larger value or signature that identifies a photograph. This larger identifier value may include its fingerprint and certain metadata, such as the moment in time (and location in space) when the photograph was created. Such a moment is useful in creating timelines as well as clustering content in content management systems, and may be used as, or as a component of, an identifier for the content item. A fuller description of how exemplary moments may be specified and processed in a content management system is provided in a companion United States patent application herewith entitled DATE AND TIME HANDLING, filed on Mar. 15, 2013, Ser. No. 61/801,318, which is hereby fully incorporated herein by this reference. Thus, if an existing photograph is to be replaced with a newly uploaded better version of it, the moment which previously pointed to the old version now must point to the new version of the same photograph, and thus in any cluster, timeline or other display structure or process which uses moments to determine display, may now avail itself of the new version of the photograph. The moment, therefore, is a superset of the fingerprint or can be, for example, a separate number altogether associated or linked with the fingerprint. Because the next steps involve merging metadata associated with the two duplicate or near duplicate photographs, moments—or other metadata records—may be fetched instead of just the fingerprints once it has been established that the fingerprints are duplicates or near duplicates. Thus, at 1450, the moment which points to the alleged duplicate medium is fetched, where "medium" in this sense refers to the content, either the photograph or an image or any other type of content that can be stored in a content management system.

Once both media are present, at 1460 it can be determined which of them is larger, the previously stored photograph or the newly uploaded one. In general, users desire to keep the best copy of a content item, so in this example at 1470 the larger medium is retained, the metadata for both media are merged, a history entry may be created capturing the date of the duplicate detection and the action taken, and the moment then pointed to the larger medium, if the larger medium is the newly uploaded content.

Not shown in FIG. 14 are various processes that can be implemented following the decision at 1470. For example, the old medium may be discarded, or for example, tagged for a later "garbage collection" process which cleans up all such replaced duplicates at some periodic interval. For the near duplicate case, the less desirable copy can be presented to a user for further instructions. In some examples instead of an automatic retention of the larger medium at 1470, the decision may be referred to a user as well.

It is noted that using the disclosed techniques for duplicate and near duplicate detection, various actions may be taken upon discovery of such duplicates or near duplicates. A different threshold T may be used for duplicates and near duplicates, and the degree of similarity (or dissimilarity) may be used as an input to various system rules for actions taken.

In exemplary embodiments of the present invention, any suitable programming language can be used to implement the routines of particular embodiments including C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/Figs. can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for organization and presentation of photos thereof, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

The invention claimed is:

1. A method for organizing content via a content management system, comprising:
   generating, using at least one processor, a first cell array for a first image, the first cell array comprising a grid of cells corresponding to regions of the first image, the grid of cells comprising numeric values representative of pixel intensity values of the corresponding regions of the first image;
   generating a first image fingerprint for the first image, the first image fingerprint comprising a sequence of the numeric values of the first cell array;
   comparing the first image fingerprint for the first image to a plurality of previously generated image fingerprints for a plurality of images;
   identifying, from the plurality of images, one or more similar images to the first image by determining that the one or more similar images are similar to, but not duplicates or near duplicates of the first image, based on a similarity of each of the one or more similar images being less than a defined threshold of allowed dissimilarity for duplicates or near duplicates, and by excluding one or more other images that are duplicates or near duplicates of the first image, based on a similarity of each of the one or more other images being higher than the defined threshold of allowed dissimilarity for duplicates or near duplicates; and
   displaying the first image and the one or more similar images together within a graphical user interface in accordance with the determination that the one or more similar images are similar to, but not duplicates or near duplicates of the first image.

2. The method of claim 1, further comprising, prior to generating the first cell array for the first image, normalizing the first image to a standard orientation.

3. The method of claim 2, wherein normalizing the first image to the standard orientation comprises:
   generating a normalization cell array comprising numeric values representative of pixel intensity values of the first image; and
   rotating the first image to the standard orientation based on the numeric values of the normalization cell array.

4. The method of claim 3, wherein generating the first cell array for the first image comprises generating a cell array having a finer granularity of cells than the normalization cell array.

5. The method of claim 1, further comprising preparing the first image for generating the first cell array by resizing the first image to a defined size, the defined size corresponding to a size of the plurality of images associated with the previously generated image fingerprints.

6. The method of claim 1, wherein generating the first cell array for the first image comprises calculating average pixel intensity values for the regions of the first image corresponding to each cell of the grid of cells.

7. The method of claim 6, wherein calculating the average pixel intensity values comprises averaging one or more of a lightness, a brightness, an intensity, or a pixel value across all pixels of a region of the first image corresponding to a cell of the grid of cells.

8. The method of claim 1, wherein generating the first image fingerprint for the first image comprises generating a sequence of binary values corresponding to the cells of the grid of cells.

9. The method of claim 8, wherein generating the sequence of binary values comprises calculating binary values corresponding to ranges of average pixel intensity values for the regions of the first image, as represented by the grid of cells.

10. The method of claim 1, wherein comparing the first image fingerprint for the first image to the plurality of previously generated image fingerprints comprises determining a number of the numeric values of the first image fingerprint that are equal to corresponding numeric values of the previously generated image fingerprints.

11. The method of claim 1, wherein identifying the one or more similar images to the first image comprises determining that at least a threshold number of the numeric values of the first image fingerprint match corresponding numeric values of image fingerprints for the one or more similar images.

12. The method of claim 1, further comprising:
    determining that a second image is a duplicate or near duplicate of the first image, based on a similarity of the second image being greater than the defined threshold of allowed dissimilarity for duplicates or near duplicates;
    saving the first image; and
    deleting the second image in accordance with the determination that the one or more similar images are duplicates or near duplicates of the first image.

13. The method of claim 12, further comprising merging metadata comprising a history of actions taken with respect to the second image into a record associated with the saved first image.

14. The method of claim 1, further comprising preparing the first image for generating the first cell array, wherein preparing the first image comprises:
    identifying a skew angle of the first image; and
    correcting the skew angle of the first image.

15. A non-transitory computer readable medium containing instructions that, when executed by at least one processor of a computing device, cause the computing device to:
    generate a first cell array for a first image, the first cell array comprising a grid of cells corresponding to regions of the first image, the grid of cells comprising numeric values representative of pixel intensity values of the corresponding regions of the first image;
    generate a first image fingerprint for the first image, the first image fingerprint comprising a sequence of the numeric values of the first cell array;
    compare the first image fingerprint for the first image to a plurality of previously generated image fingerprints for a collection of images;
    identify, from the collection of images, one or more similar images to the first image by determining that the one or more similar images are similar to, but not duplicates or near duplicates of the first image, based on a similarity of each of the one or more similar images being less than a defined threshold of allowed dissimilarity for duplicates or near duplicates, and by excluding one or more other images that are duplicates or near duplicates of the first image, based on a similarity of each of the one or more other images being higher than the defined threshold of allowed dissimilarity for duplicates or near duplicates; and
    display the first image and the one or more similar images together within a graphical user interface in accordance with the determination that the one or more similar images are similar to, but not duplicates or near duplicates of the first image.

16. The non-transitory computer readable medium of claim 15, further comprising instructions that, when executed by the at least one processor of the computing device, cause the computing device to, prior to generating the first cell array for the first image, normalize the first image to a standard orientation, wherein normalizing the first image to a standard orientation comprises:
    generating a normalization cell array based on pixel intensity values of the first image prior to rotating the first image; and
    rotating the first image to the standard orientation based on numeric values of the normalization cell array.

17. The non-transitory computer readable medium of claim 15, wherein:
    generating the first cell array for the first image comprises calculating an average pixel intensity value for each region of the first image corresponding to each cell of the grid of cells; and
    generating the first image fingerprint for the first image comprises generating a sequence of binary values corresponding to the calculated average pixel intensity values for cells of the grid of cells.

18. A system comprising:
    at least one processor; and
    at least one non-transitory computer readable storage medium storing instructions thereon that, when executed by the at least one processor, cause the system to organize content by:
        generate a first cell array for a first image, the first cell array comprising a grid of cells corresponding to regions of the first image, the grid of cells comprising numeric values representative of pixel intensity values of the corresponding regions of the first image;
        generate a first image fingerprint for the first image, the first image fingerprint comprising a sequence of the numeric values of the first cell array;
        compare the first image fingerprint for the first image to a plurality of previously generated image fingerprints;
        identify, from the plurality of images, one or more similar images to the first image by determining that the one or more similar images are similar to, but not duplicates or near duplicates of the first image, based on a similarity of each of the one or more similar images being less than a defined threshold of allowed dissimilarity for duplicates or near duplicates, and by excluding one or more other images that are duplicates or near duplicates of the first image, based on a similarity of each of the one or more other images being higher than the defined threshold of allowed dissimilarity for duplicates or near duplicates; and
        display the first image and the one or more similar images together within a graphical user interface in accordance with the determination that the one or more similar images are similar to, but not duplicates or near duplicates of the first image.

19. The system of claim 18, wherein the instructions further cause the system to, prior to generating the first cell array for the first image, normalize the first image to a standard orientation, wherein normalizing the first image to a standard orientation comprises:
    generating a normalization cell array based on pixel intensity values of the first image prior to rotating the first image; and
    rotating the first image to the standard orientation based on numeric values of the normalization cell array.

20. The system of claim 18, wherein:
generating the first cell array for the first image comprises calculating an average pixel intensity value for each region of the first image corresponding to each cell of the grid of cells; and
generating the first image fingerprint for the first image comprises generating a sequence of binary values corresponding to the calculated average pixel intensity values for cells of the grid of cells.

\* \* \* \* \*